United States Patent [19]

Frey et al.

[11] Patent Number: 5,694,784

[45] Date of Patent: Dec. 9, 1997

[54] VEHICLE AIR CONDITIONING SYSTEM

[75] Inventors: Michael Frey, Lindau, Germany; Frank Obrist, Dornbirn, Austria

[73] Assignee: Tes Wankel Technische Forschungs-Und Entwicklungsstelle Lindau GmbH, Lindau, Germany

[21] Appl. No.: 640,155

[22] Filed: Apr. 30, 1996

[30] Foreign Application Priority Data

May 10, 1995 [CH] Switzerland ................... 348/95

[51] Int. Cl.$^6$ .......................................... F25B 1/02
[52] U.S. Cl. ................... 62/228.5; 62/470; 62/502
[58] Field of Search ...................... 62/228.5, 228.1, 62/228.3, 228.4, 502, 114, 505, 468, 470, 473, 197, 196.1, 196.2, 196.3

[56] References Cited

U.S. PATENT DOCUMENTS

| | | | |
|---|---|---|---|
| 4,709,555 | 12/1987 | Kawai et al. | 62/196.2 X |
| 4,841,737 | 6/1989 | Fujii et al. | 62/228.5 X |
| 4,880,356 | 11/1989 | Suzuki et al. | 62/228.5 X |
| 5,027,612 | 7/1991 | Terauchi | 62/228.5 X |
| 5,205,718 | 4/1993 | Fujisawa et al. | 417/222.2 |

FOREIGN PATENT DOCUMENTS

| | | |
|---|---|---|
| 0424474 | 8/1993 | European Pat. Off. . |
| 4139186 | 6/1992 | Germany . |

*Primary Examiner*—Harry B. Tanner
*Attorney, Agent, or Firm*—Ladas & Parry

[57] ABSTRACT

In a vehicle air conditioning system $CO_2$ as the refrigerant is compressed by an internally controlled swash plate compressor (1) and circulates in a main circuit (2) having at least two heat exchangers (3, 5). An expansion valve (4) subdivides the main circuit (2) into a high and a low pressure part. The capacity control of the swash plate compressor (1) and therefore the air conditioning system takes place by means of a valve (23), which is located in a partial circuit (22) branched from the main circuit (2) by means of a constant choke (21) and which includes the drive chamber (18) of the swash plate compressor (1), so that in the latter it is possible to modify the pressure for adjusting the stroke length of the compressor piston (7). The branching point for the partial circuit (22) is located on an oil separator (20), which is located in the flow direction behind a first heat exchanger (5), so that the swash plate compressor (1) is cooled and is supplied with returned, cooled oil.

10 Claims, 3 Drawing Sheets

VEHICLE AIR CONDITIONING SYSTEM

BACKGROUND OF THE INVENTION

The invention relates to a vehicle air conditioning system according to the $CO_2$ cold vapour process, in which carbon dioxide ($CO_2$) as the refrigerant is circulated in a closed circuit by means of a compressor, at least two heat exchangers being successively arranged in the flow direction and a compressor is positioned between them on one side and an expansion valve is located between them on the opposite side of the circuit.

The fundamental advantage of using $CO_2$ as opposed to using other refrigerants is that it cannot be prejudicial to the environment.

An air conditioning system operating according to the $CO_2$ cold vapour process is e.g. known from EP-B-424474. In the latter the control of the cooling or refrigerating capacity takes place in that the circulating refrigerant is passed through a reservoir downstream of the expansion valve and upstream of the compressor, so that the circulating refrigerant quantity is changed by evaporation from the reservoir as a function of the control pressure of the expansion valve controlling the system. However, such a control only responds with a considerable time lag and there is only a relatively narrow control range of max 1:3.

In connection with the use of another refrigerant, it is known from U.S. Pat. No. 5,205,718 to modify the refrigerating capacity by controlling the stroke length of the piston of a swash plate compressor. This is brought about by a connection between the pressure side and the drive chamber produced by a control valve, so that the inclination of the swash plate and consequently the stroke length is adjusted as a function of the pressure in the drive chamber. This makes it possible to achieve a much greater control range, which is desirable for use in a vehicle air conditioning system.

However, an obstacle to the use of a swash plate compressor for a $CO_2$ cold vapour process is the much higher compression and temperature loads on the compressor and which inter alia by rapid ageing or coking of the lubricant lead to damage, e.g. on its slip ring seal and swash plate mechanism. The problem of the invention is to find an easily implementable procedure for combining the advantages of using $CO_2$ as the refrigerant and the control advantages of using a compressor controlled via the pressure in the drive chamber, without harmful operating conditions occurring on the compressor, so that for a vehicle air conditioning system of the aforementioned type, with a wide control range, high reliability is achieved.

SUMMARY OF THE INVENTION

In the case of a system of the aforementioned type, the invention solves this problem in that the compressor is controllable via the pressure in its drive chamber and a partial circuit branched from the circuit in the drive chamber of the compressor leads from the latter to its suction line, the partial circuit containing a valve limiting the flow quantity and a control valve, so that the pressure in the drive chamber and therefore the capacity of the compressor can be controlled and the branching point is located in the direction of the circuit flow between the first heat exchanger in the flow direction and the expansion valve, so that the partial circuit cools the compressor.

BRIEF DESCRIPTION OF THE DRAWINGS

The invention is described in greater detail hereinafter relative to advantageous embodiments and the attached drawings, wherein show.

DETAILED DESCRIPTION OF EMBODIMENTS

Figure 1:
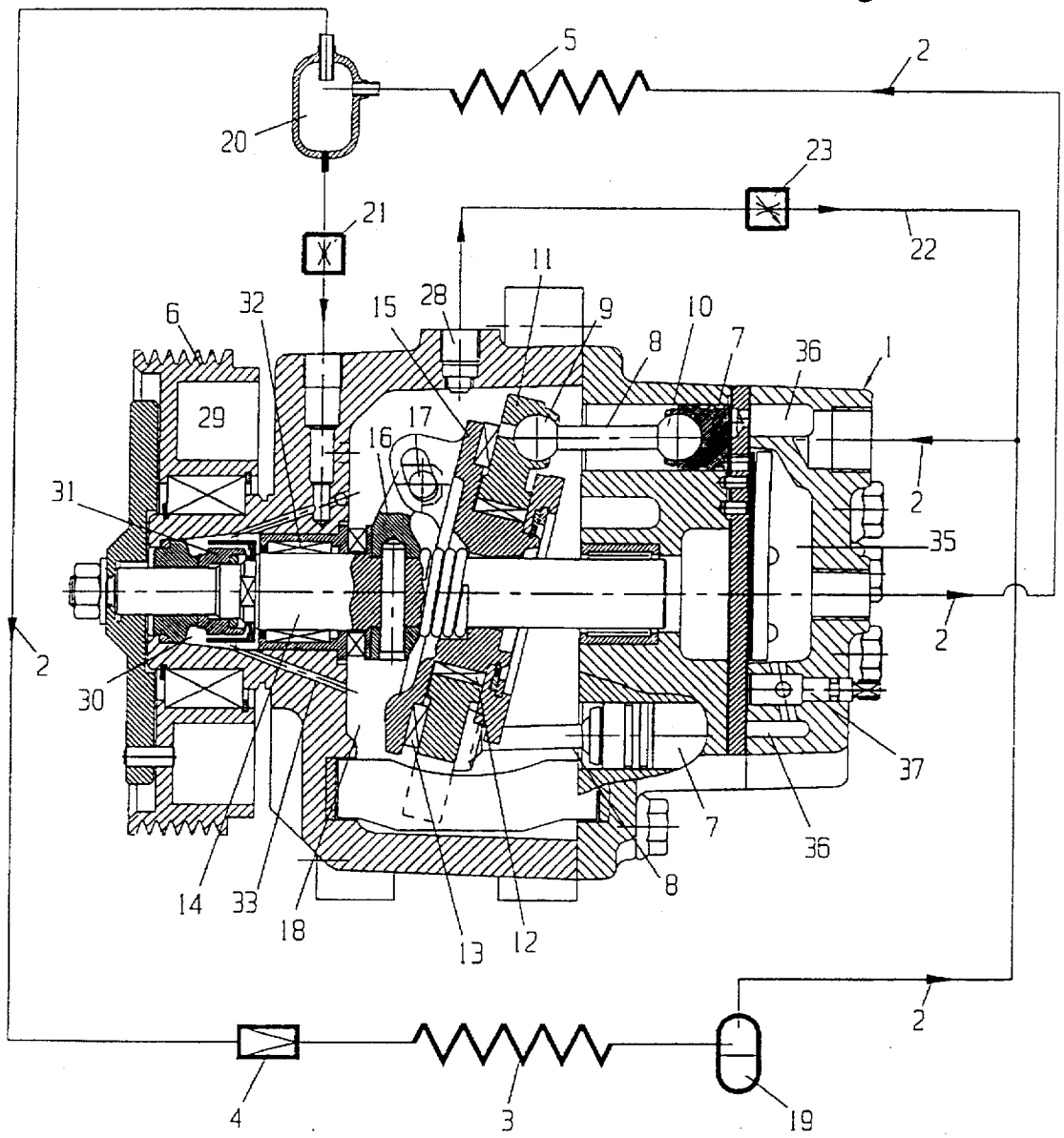
FIG. 1 A diagrammatic representation of a first embodiment of an air conditioning system with a cross-sectional representation of a swash plate compressor.
Figure 2:
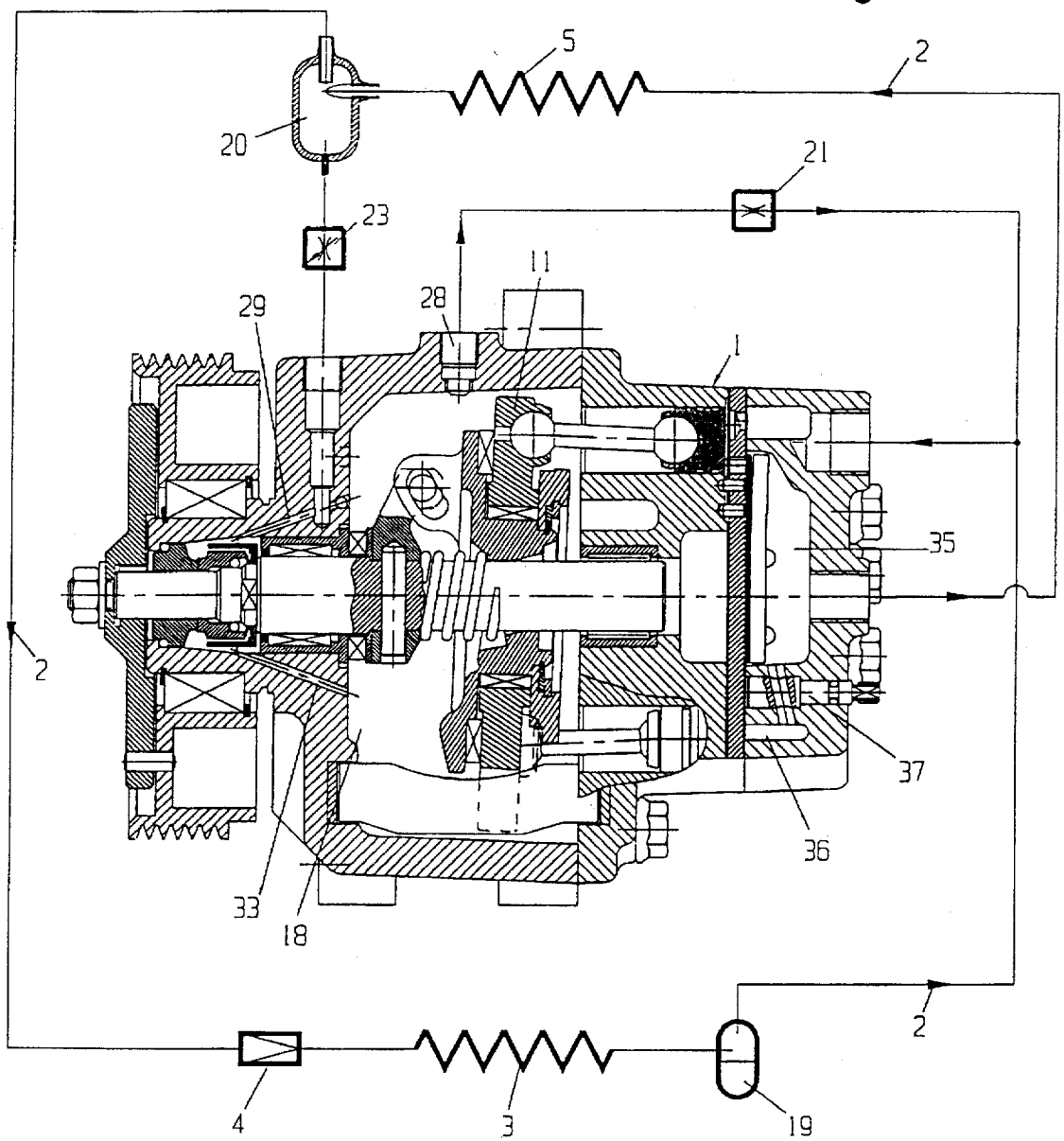
FIG. 2 A diagrammatic representation of a second embodiment of an air conditioning system, with a swash plate compressor, whose swash plate is set in a different working position to that of FIG. 1.
Figure 3:
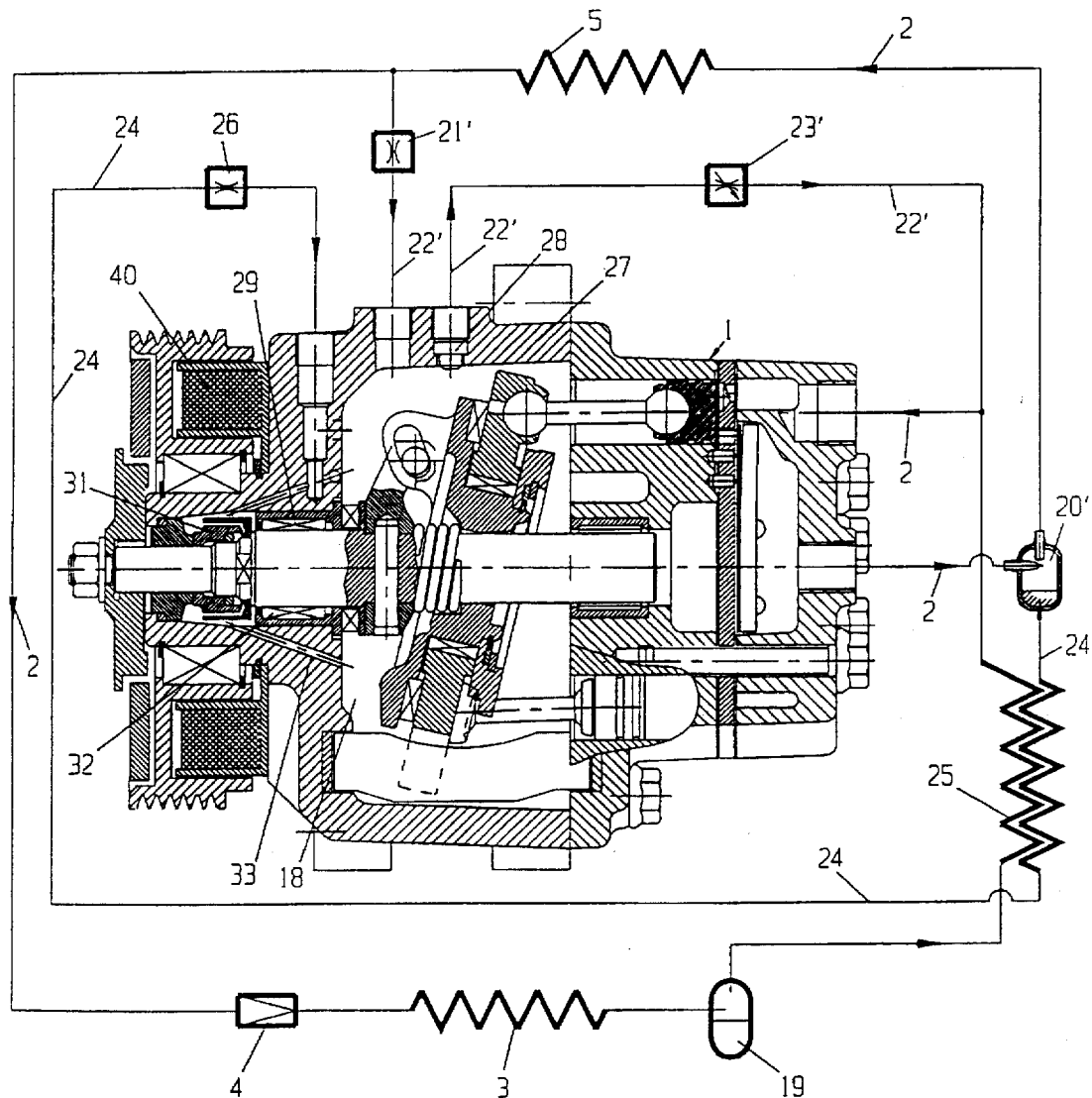
FIG. 3 A diagrammatic representation of a third embodiment of an air conditioning system with a swash plate compressor having a magnetic clutch.

A system for performing the process according to the invention has, according to FIGS. 1, 2 and 3, in per se known manner a compressor 1, a heat exchanger 5 connected in the circulation direction corresponding to the arrow 2 and in which heat is removed from the circulating refrigerant, an expansion valve 4 connecting in the circuit direction, as well as a further heat exchanger through which cooling takes place, in that the refrigerant therein receives heat from the outside.

For the air conditioning of the passenger compartment of a motor vehicle conventionally in subcritically operating cooling processes a first heat exchanger 5, normally called a condenser, is cooled by the ambient air, in that the latter flows to the heat exchanger 5 as slip stream or is blown by an additional blower. The heat-receiving or cooling, second heat exchanger 3, which is normally known as an evaporator, is located in the fresh air distribution system of the motor vehicle or an associated bypass duct thereof, so that the fresh air can be cooled when needed. In the flow direction behind the second heat exchanger 3 can be provided a buffer container 19, in that an unevaporated part of the refrigerant ($CO_2$) settles, so that in accordance with the operating state of the system there is a stored refrigerant quantity in said container.

The compressor 1 constructed as a controllable swash plate compressor 1 is connected in the embodiment of FIGS. 1 and 2 to the vehicle drive, e.g. by a not shown V belt, which runs on the belt pulley 6. Its fundamental construction and operation are known from the literature, such as e.g. U.S. Pat. No. 5,205,718 or DE-A-4139186. It is obvious that the invention can be used for any compressor type, whose capacity control takes place by means of the controlled pressure in its drive chamber 18.

The pistons 7 of the swash plate compressor 1, whereof e.g. seven are juxtaposed in the circumferential direction of the compressor, are operated by rods 8, whose two ends are pivotably mounted by ball ends 9, 10 on the one hand on the piston 7 and on the other on the swash plate 11. The swash plate 11 is held by a radial bearing 12 and an axial bearing 13 on a plate carrier 15, which is pivotably mounted and rotates with the drive shaft 14, so that the rotary movement of the tilted plate carrier 15 brings about a wobbling movement of the swash plate 11 and consequently the pistons 7 connected to the latter perform a stroke or lifting movement. The connection between the drive shaft 14 and the plate carrier 15 takes place through a driving joint 17 provided at the end of a driving arm 16. The force for the pivoting movement of the plate carrier 15 and the swash plate 11 mounted thereon around the driving joint 17 is obtained from the sum of the pressures acting against one another on either side of the piston 7, so that said force is dependent on the pressure in the drive chamber 18.

FIGS. 1 and 2 show two positions of the inclination of the swash plate 11. Corresponding to the inclination of the swash plate there is a modification to the bottom dead center of the piston movement, whereas the top dead center remains unchanged or substantially unchanged. The higher the pressure at the underside of the piston 7 or in the drive chamber 18 compared with the pressure on the top of the piston 7 or on the suction side of the compressor 1, the smaller the stroke length of the piston 7 and therefore the discharge capacity of the compressor 1.

As for producing a control pressure in the drive chamber 18 of the compressor $CO_2$ flows into it and then passes out to the suction side, it is unavoidable that oil provided for the lubrication of the moving parts of the compressor 1 will enter the $CO_2$ circuit.

In order to return the oil from the cooling circuit 2 into the drive chamber, according to the embodiment of FIG. 1 an oil separator 20 is provided in the flow direction behind the first exchanger 5. For said oil separator use is e.g. made of the cyclone principle, in that the inflow is directed tangentially to its cylindrical wall. As a result of the reduced temperature, the arrangement behind the heat exchanger 5 leads to an easier separation from the $CO_2$, which is in the supercritical state. The bottom drain of the oil separator 20 or an oil-separating location of the heat exchanger 5, is connected by means of a constant choke 21 to the drive chamber 18 of the compressor 1, so that the separated oil passes, together with the refrigerant ($CO_2$), into the drive chamber 18. This connection forms a partial circuit 22 branched from the main circuit 2, so that a connection from the drive chamber 18 of the swash plate compressor 1 leads to the compressor suction line.

The partial circuit 22 guided over the drive chamber 18 has, in addition to the return of oil and the cooling of the compressor 1, the further task of controlling the capacity of the compressor 1. For this purpose, in addition to the constant choke 21 limiting the flow quantity, the partial circuit 22 contains a control valve 23, which determines the pressure in the drive chamber and consequently the stroke length of the piston 7.

The embodiment of FIG. 2 differs from that of FIG. 1 by a reverse arrangement of the constant coke 21 and control valve 23 in the partial circuit. In both embodiments an expansion of the refrigerant ($CO_2$) taking place during the flow to the drive chamber 18 brings about a temperature drop, which is obtained in addition to the cooling in the heat exchanger 5.

In the embodiment according to FIG. 3 the oil separator 20' is positioned upstream of the first heat exchanger 5 in the main circuit 2. In order to return the separated oil in cooled form to the drive chamber 18, a separate oil circuit 24 is provided, in which is located an oil cooler 25, through which the separated oil is delivered under the high pressure side pressure of the compressor. The flow quantity to the drive chamber 18 is limited by the constant choke 26. Oil cooling takes place in countercurrent manner to the main circuit 2, in that the oil cooler 25 is positioned behind the second heat exchanger 3 in the flow direction of the main circuit 2. Also in this air conditioning system embodiment a partial circuit 22' can be provided for controlling and cooling the compressor 1 and which is branched following the first heat exchanger 5 and has a constant choke 21', as well as a control valve 23'.

In the part of the partial circuit 22, 22' leaving the drive chamber 18 and preferably in the casing wall 27 of said chamber 18, a further oil separator 28 can be provided, which retains oil in the chamber 18.

The supply of returned, cooled oil to the drive chamber 18 preferably takes place through a sloping bore 29 in a secondary chamber 30 of the drive chamber 18 used for sealing and shaft bearing purposes, so that in particular also there the slip ring seal 31 and shaft bearing 32 are supplied with oil and well cooled. From said secondary chamber 13 the oil is passed to the main chamber of the drive chamber 18 including the swash plate drive 11, 15 by means of a bore 33, which passes from a specific point in the lower region of the secondary chamber 30 with a specific inclination, which guarantees that an oil quantity is retained which ensures a good lubrication in the secondary chamber 30.

To avoid a disadvantageous switching on and off of the compressor 1 for controlling or disconnecting the refrigerating capacity, according to a further embodiment of the invention the discharge capacity of the compressor can be reset to zero, so that the magnetic clutch 40 in the embodiment according to FIG. 2 is rendered superfluous. For this purpose the flow at the compressor 1 can be short-circuited by a valve 37 shown in FIGS. 1 and 2 and which is positioned between its suction side 36 and the pressure side 35 of the compressor 1. FIG. 1 shows the shaft of the valve 37 in the closed rotation position, whereas FIG. 2 shows the zero capacity position, in which the swash plate 11 has the smallest inclination and the valve shaft is in the open rotary position.

For a zero control, it would also be possible to disconnect the function of the compressor valve, so as to prevent a discharge or compression of $CO_2$.

It is obvious that the embodiments of FIGS. 1 or 2 can be combined with that of FIG. 3, in that in each case an oil separator 20, 20' is provided upstream and downstream of the heat exchanger 5.

We claim:

1. Vehicle air conditioning system according to the $CO_2$ cold vapour process, in which carbon dioxide ($CO_2$) as the refrigerant is circulated in a closed circuit (2) by means of a compressor (1), at least two heat exchangers (3, 5) being successively arranged in the flow direction and a compressor (1) is positioned between them on one side and an expansion valve (4) is located between them on the opposite side of the circuit (2), wherein the compressor is controllable via the pressure in its drive chamber (18) and a partial circuit (22, 22') branched from the circuit in the drive chamber (18) of the compressor (1) leads from the latter to its suction line, the partial circuit containing a valve (21, 21') limiting the flow quantity and a control valve (23, 23'), so that the pressure in the drive chamber (18) and therefore the capacity of the compressor can be controlled and the branching point is located in the direction of the circuit flow between the first heat exchanger (5) in the flow direction and the expansion valve (4), so that the partial circuit (22, 22') cools the compressor (1).

2. Air conditioning system according to claim 1, wherein an oil separation point (20) is provided in the circuit (2) behind the first heat exchanger (5) in the flow direction, the branching point for the partial circuit (22, 22') leading through the drive chamber (18) being located at the oil separation point (20), so that the partial flow in the vicinity of the oil separation point (20) carries separated oil to the drive chamber (18).

3. Air conditioning system according to claim 1, wherein an oil separator is provided in the flow direction between the compressor (1) and the first heat exchanger (5), from which the oil is supplied under the high pressure side pressure of the compressor (1) through an oil circuit (24) provided in addition to the partial circuit (22') to the drive chamber (18) of the compressor (1), a flow-limiting valve (26) being located in the oil circuit (24).

4. Air conditioning system according to claim 1, wherein the branched partial circuit (22) runs in the secondary chamber (30) used for shaft sealing (31) and shaft mounting (32) and from said secondary chamber into the main chamber of the drive chamber (18).

5. Air conditioning system according to claim 1, wherein the branched partial circuit (22) runs through at least one casing bore (29, 33) in the vicinity of the shaft seal (31).

6. Air conditioning system according to claim 1, wherein an oil separator (28) through which flows the partial circuit (22, 22') is provided on the drive chamber (18) and prevents an entraining of oil from said drive chamber (18).

7. Air conditioning system according to claim 3, wherein a countercurrent oil cooler (25) is provided in the oil circuit, the countercurrent part of the oil cooler (25) being located in the flow direction between the second heat exchanger (3) and the suction side of the compressor (1).

8. Air conditioning system according to claim 1, wherein an oil duct leading from the secondary chamber (30) into the main chamber of the drive chamber (18) passes in inclined upward direction from the lowest point of the secondary chamber (30), so that oil collects on the bottom of the secondary chamber (30).

9. Air conditioning system according to claim 1, wherein the compressor (1) is in constant drive connection with a vehicle drive, it being possible to set the capacity of the compressor (1) to zero.

10. Air conditioning system according to claim 9, wherein a connection having a valve (37) is provided between its pressure and suction chambers (35, 36) for regulating the capacity of the compressor (1) to zero.

\* \* \* \* \*